United States Patent [19]
Salewsky

[11] 3,785,671
[45] Jan. 15, 1974

[54] SAFETY BRACKET FOR A MOTOR CAR
[75] Inventor: Gert Salewsky, Lenting, Germany
[73] Assignee: Audi Nsu Auto Union A.G., Ingolstadt, Germany
[22] Filed: Dec. 29, 1971
[21] Appl. No.: 213,408

[30] Foreign Application Priority Data
Feb. 13, 1971   Germany............... P 21 06 963.6

[52] U.S. Cl................................. 280/87 R, 74/492
[51] Int. Cl............................................ B62d 1/18
[58] Field of Search............ 280/87 R, 87 A, 87 B; 180/78; 74/492, 493; 70/252

[56]    References Cited
        UNITED STATES PATENTS
3,505,897   4/1970   Scheffler et al....................... 74/492
3,612,223   12/1968  Schiomi.............................. 74/492
3,502,346   3/1970   Cadiou.............................. 280/87 R
3,400,563   9/1968   Lempke et al........................ 70/252
3,412,629   11/1968  Hill................................. 74/493
2,836,079   5/1958   Salch................................ 74/493

Primary Examiner—Kenneth H. Betts
Assistant Examiner—John A. Carroll
Attorney—Richards & Geier

[57]            ABSTRACT

A bracket is used for carrying a body pipe for a safe steering of a motor car. The invention is characterized in that the bracket is composed of a carrying member and a shaping member.

6 Claims, 5 Drawing Figures

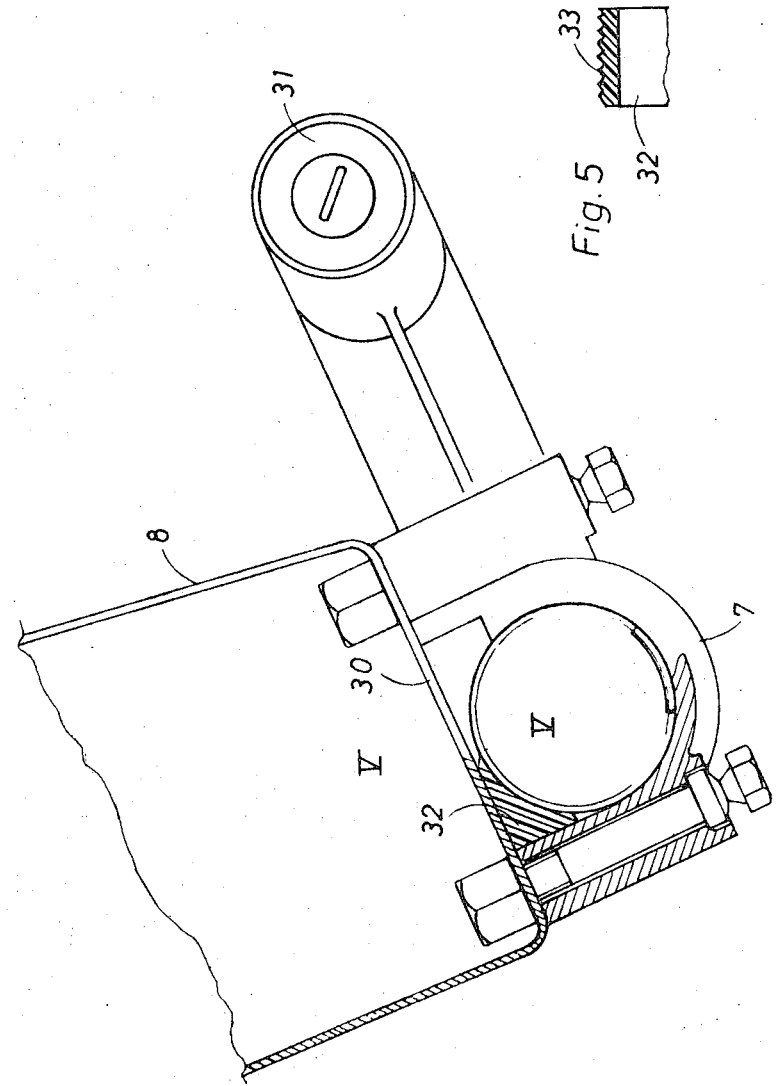
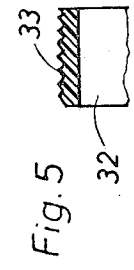
Fig. 3
Fig. 5

SAFETY BRACKET FOR A MOTOR CAR

This invention relates to a bracket for carrying a body pipe for a safe steering of a motor car.

An object of the present invention is to provide simple means which on the one hand brakes the steering wheel with the shell pipe by form changing should the driver fall upon the steering wheel and on the other hand to prevent the shell pipe and the steering wheel from being pushed rearwardly should the shape of the front part of the car be changed as the result of collision.

Other objects of the present invention will become apparent in the course of the following specification.

In the accomplishment of the objectives of the present invention it was found desirable to provide a bracket composed of a carrying member and a shaping member. If in case of an accident the driver is thrust upon the steering wheel the wheel will move forward guided by the carrying member and braked by the shaping member.

The carrying member is made shapeable by bending or by a break location.

Middle parts of the side walls of the bracket are preferably shaped triangularly or trapeze-like and are foldable, while the outer parts of the side walls and preferably the upper wall and other side wall parts are rigid against form change. In case of an accident the body pipe changes the shape of the foldable parts of the bracket in a swinging movement about an imaginary axis extending through the upper corners of the triangles, whereby the bracket by the form change brakes with substantially equal resistance the forward movement of the driver upon the steering wheel.

The inner part of the lower wall can be made foldable and the two edges of the lower wall can be shaped as rigid rods. Then if the driver should strike the steering wheel the bracket will be folded. If, however, in case of an accident a force is exerted upon the shell pipe and the hook joint of the steering shaft is pulled apart, then the bracket will oppose its change in this direction by the rods by a substantially greater resistance and thus it will prevent that in case of a collapse of the front car portion the steering wheel would be pushed into the interior of the car.

If the walls of the bracket are wedge-like reduced in widths or height toward one of its ends, there is the advantage that the shapeable parts of the walls are shifted past each during folding so that the extent of the form change is increased.

Preferably an end of the bracket can enclose tonglike a transverse carrier, preferably the carrier for the switch board; then the bracket is connected in a simple manner to a strong part which is available and which is necessary for carrying the switch board and strengthening the car body.

The bracket can be composed of a sheet metal piece forming the middle grill-like perforated lower wall and the middle grill-like perforated side walls and of sheet metal piece forming the upper wall and the ends of the side walls. In case of an accident the grill-like perforated portions of the walls yield while changing their form with a substantially uniform resistance while in normal operation the non-perforated upper wall and the non-perforated side wall ends safely absorb all forces transmitted to the steering wheel by the driver or possibly by the road.

Furthermore, to save space and material the bracket can be fixed to the shell pipe at its lower end by a clasp which receives the steering lock.

A distancing piece consisting preferably of a plastic material can be provided between the pipe and the end of the bracket to balance tolerances and simplify construction, the piece engaging the end of the bracket by pointed ribs.

Finally at least one pin can be provided in the grill-like perforated wall portion which is bent toward the interior of the bracket or outwardly. Then the bracket has a break location or possibly a break zone. If the bracket is folded this break zone greatly diminishes the starting resistance and thus increases the shaping capacity absorbed by the bracket.

The invention will appear more clearly from the following detailed description when taken in connection with the accompanying drawings showing by way of example only, a preferred embodiment of the inventive idea.

In the drawings:

FIG. 3 is a sectional view of a part of the device of FIG. 2 in the direction of the arrow X shown in FIG. 2.

FIG. 5 is a section through a part of the device of FIG. 3.

Figure 1:
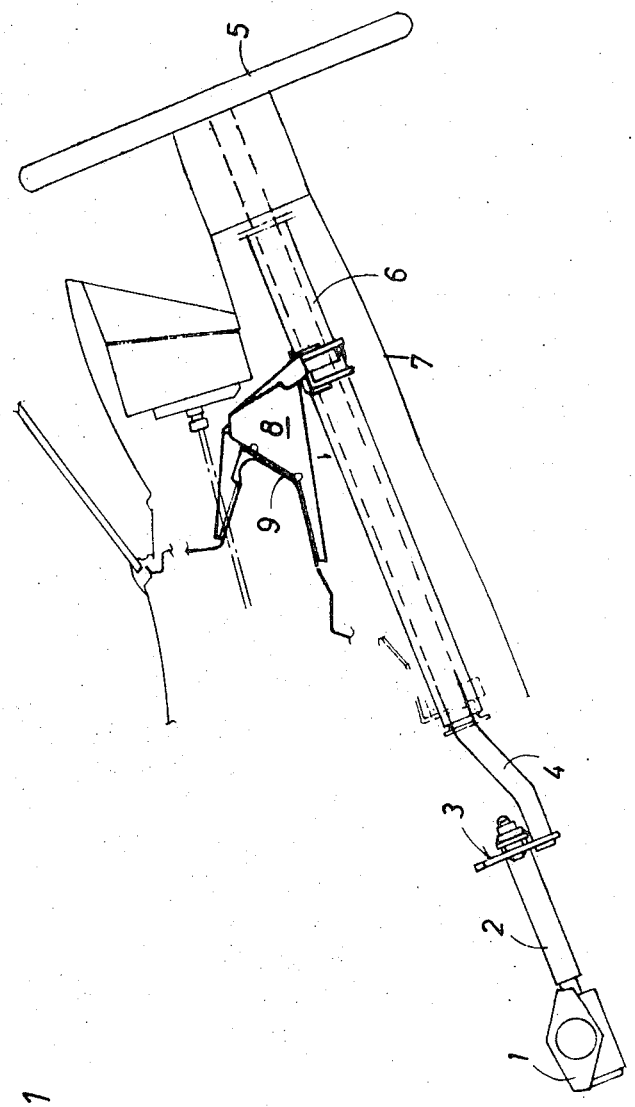
FIG. 1 is a side view showing diagrammatically a safety steering of a motor car.
Figure 2:
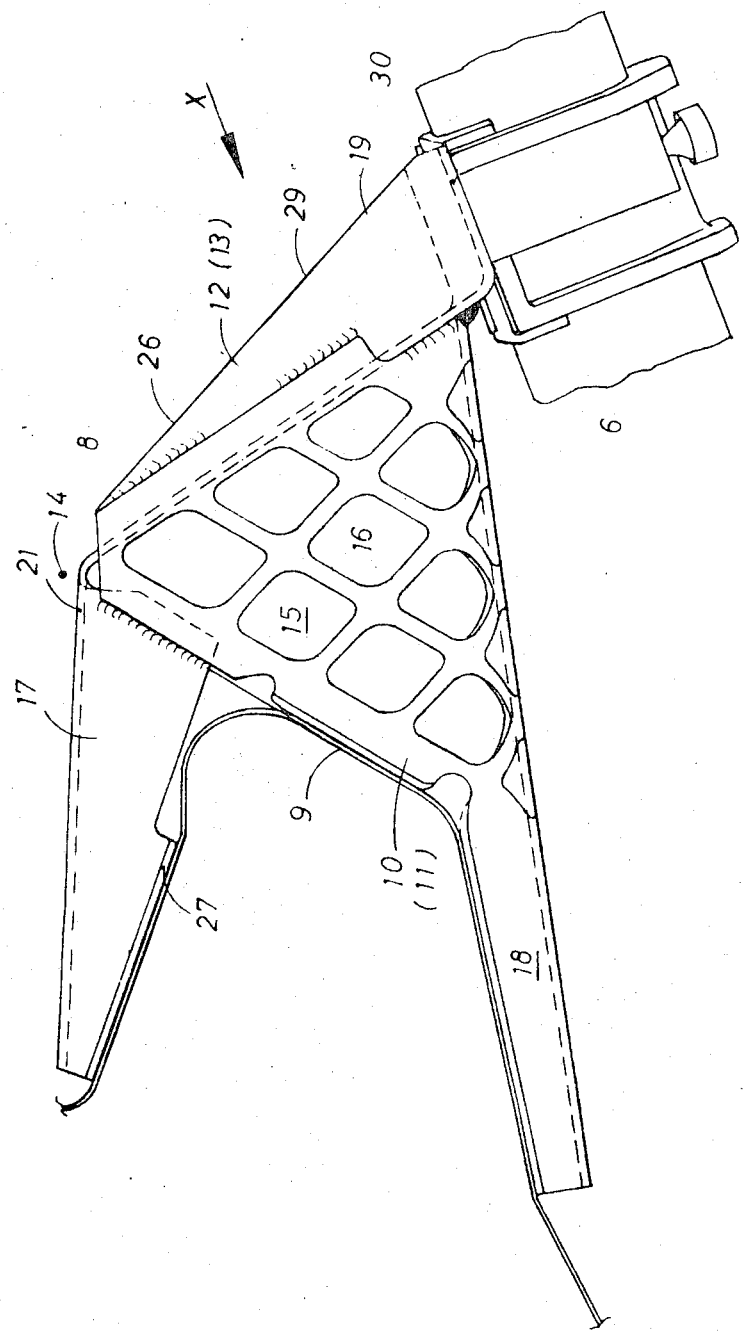
FIG. 2 is a side view of the bracket of the present invention carrying the pipe.
Figure 4:
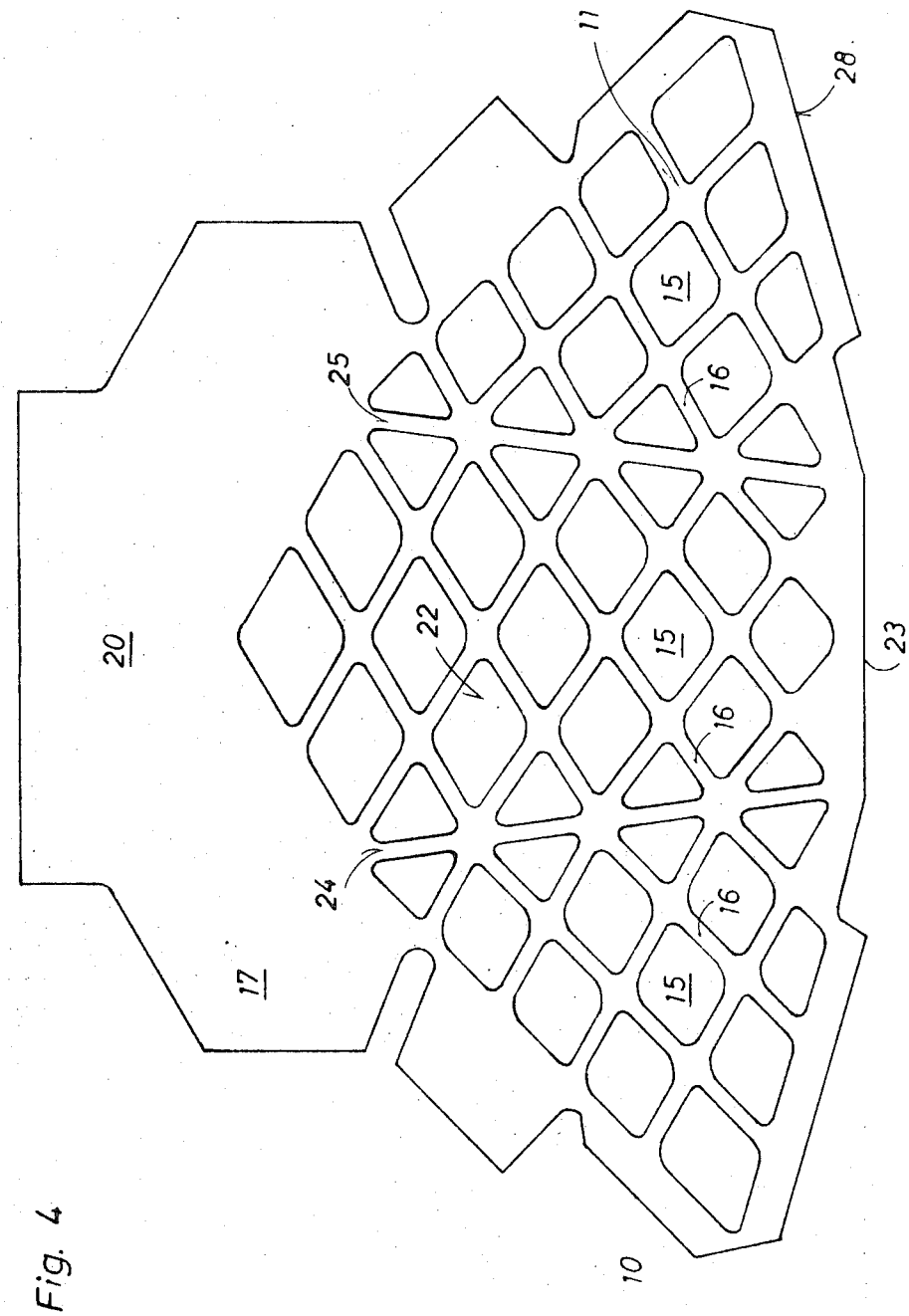
FIG. 4 is a top view of a part of the device of FIG. 2 and illustrates the shape of the bracket prior to bending.

FIG. 1 shows a gear drive 1 of a motor car from which a shaft 2 extends to a hook joint 3. A steering shaft 4 extends to a steering wheel 5. The steering shaft 4 is mounted in a sell pipe 6. The pipe 6 is movably mounted in the splash wall and is fixed by a clasp 7 to a bracket 8 which encloses tong-like the switch plate carrier 9 and is soldered thereto. As shown in FIG. 2, middle portions 10, 11 of the side walls 12, 13 of the bracket 8 are triangularly shaped and are foldable. For that purpose holes 15 are punched leaving ribs 16. The outer parts 17, 18, 19 of the side walls and other portions 20 of the walls, as well as the upper wall 21 are smooth and not perforated and are rigid against a change in shape. The lower wall has a wall portion 20 which is rigid against form change and a part 22 yielding to form change which has holes 15 and ribs 16. The edges of the lower wall 23 are of firm structure due to rods 24 and 25. The wall parts 20 of the bracket 8, as well as the wall 21 and the side walls 12, 13 are reduced wedge-like in width in the direction toward the rear end 26 of the bracket. Its other end 27 encloses tong-like the transverse carrier 9 of the switch plate and is soldered thereto. The bracket 8 is composed of a grill-like perforated part 22 of the lower wall, a sheet metal piece 28 forming the side walls 10, 11 and a supporting sheet metal piece 29 forming the side wall ends 17, 18. Thus the bracket 8 may be described as consisting of a metal sheet and having as its main parts a supporting member 29 and a form changing member 28. The lower end 30 of the bracket 8 is fixed to the shell pipe 6 by a clasp 7 receiving the steering lock 31. A distancing piece 32 consisting preferably of a plastic material, is located between the shell pipe 6 and the end 30. The distancing piece 32 engages with pointed ribs 33 the end 30 of the bracket 8. At least one rib 16 provided in the grill-like perforated wall part 10, 11 or 22 can be bent toward the interior of the bracket 8 or outwardly.

During usual driving the forces exerted by the driver upon the steering wheel 5 are transmitted by the shafts 4, 2 to the gear drive. The pipe 6 is then connected through the bracket 8 and the switch board carrier 9 with the car frame, providing a secure and precise steering of the car.

The pipe 6 is shiftable, however, in the travelling direction in case of an accident. When, for example, by the force of collision the driver drops upon the steering wheel 5 and pushes it forward, the bracket 8 will bend and will carry out a swinging movement which may be represented by imagining a swinging axis in the upper corners of the triangular wall parts 10, 11, such as 14, about which swings the end 19 with the steering shaft 4. In order to make certain that the bracket 8 will be folded completely with the same resistance force and will not have to overcome a comparatively large initial force, as is the case with other form changing bodies, the triangular wall portions of the bracket have one or more ribs 16 which can be bent or pushed inwardly or outwardly to avoid in this manner a large initial force during form changing.

If on the other hand, the accident causes the front part of the car to be pushed together, without the driver touching the steering wheel 5, then the gear drive is shifted along with the car front and the shaft 2 moving rearwardly is pressed out of the hook joint 3. This force will not be noticeable by a movement of the steering shaft 4 and the steering wheel 5, since the force which, for example, is necessary for the opening of the hook joint, is transmitted by rods 24, 25 for the form changing of the lower wall. A greater force is exerted by the bracket against the shell pipe than can be transmitted through the hook joint. Due to the conical shape and the rearward recessing of the width or height of the side walls, the folds produced by the ribs 16 are folded one next to each other, —looking in the direction of the sheel pipe, —and thus additional space is provided which would have been lost during the folding of one fold after the other if the width or height would not have been recessed, since the shaping would have been terminated after the folds would lie one upon the other. On the other hand if the folds are placed one over the other inwardly into the bracket the form changing is not prevented by the fold formation but is stopped only when the end surfaces of the bracket engage each other.

I claim:

1. In a motor car having a steering shaft, a shell pipe enclosing said steering shaft, a transverse switch plate carrier and a bracket carrying said shell pipe, said bracket consisting of a metal sheet and having a supporting member and a form changing member, said supporting member having a horizontally bent portion, said bracket having an end engaging tong-like and connected to said switch plate carrier.

2. The bracket in accordance with claim 1, having side walls with middle parts, said middle parts being triangularly shaped and being foldable, and outer parts and an upper wall, said outer parts and said upper wall being rigid against form changing.

3. The bracket in accordance with claim 2, having a lower wall with two edges, said lower wall being inwardly foldable and said two edges being rigid against form changing.

4. The bracket in accordance with claim 3, wherein said walls recede wedge-like in width or height toward one end of the bracket.

5. The bracket in accordance with claim 1, having a metal sheet piece comprising a middle grill-like perforated lower wall ane middle grill-like perforated side walls and another metal sheet piece comprising an upper wall and side wall ends.

6. The bracket in accordance with claim 6, wherein at least one of said grill-like perforated side walls has at least one rib bendable inwardly or outwardly relatively to the bracket.

* * * * *